Jan. 12, 1937.  L. WILLIAMS  2,067,807
REAR AXLE ASSEMBLY FOR MOTOR VEHICLES
Filed May 7, 1935
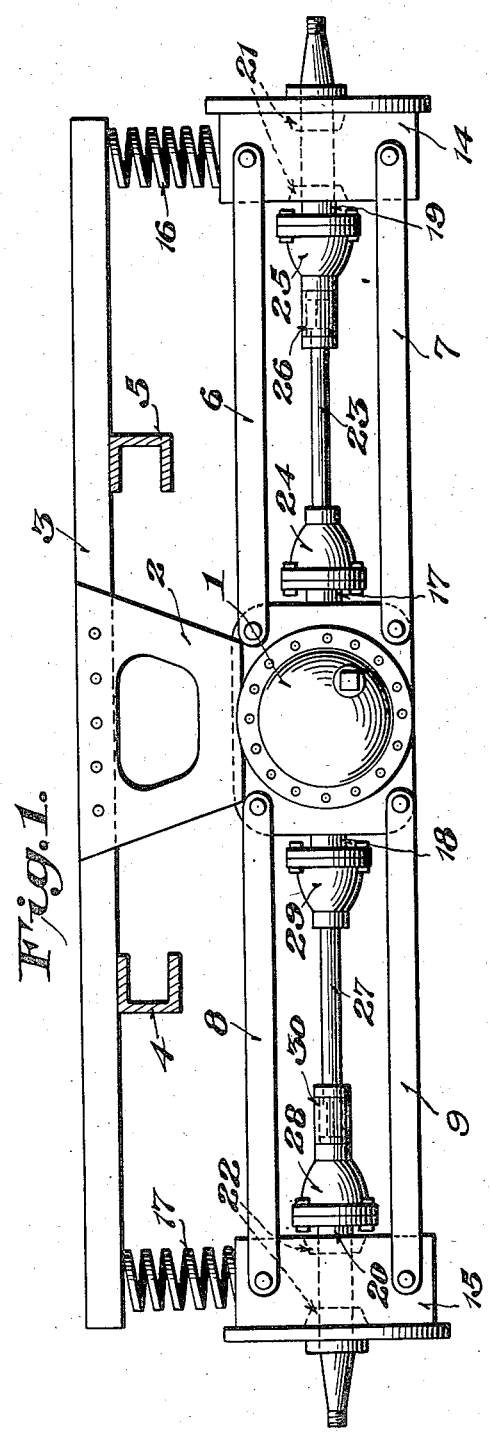
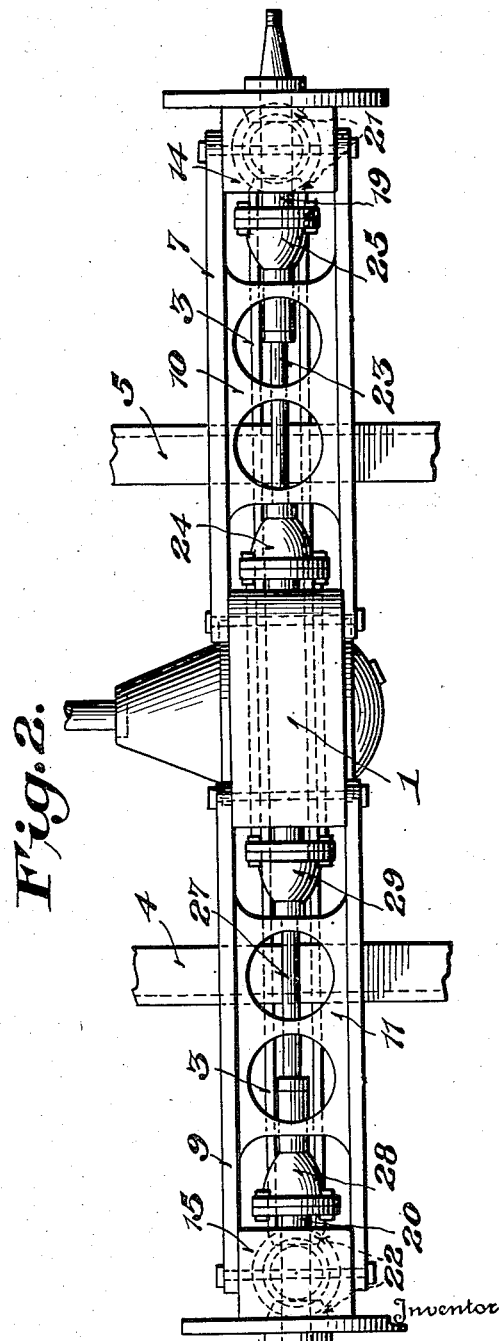
Inventor
Langdon Williams,
By L. Clyde Grant,
Attorney Patented Jan. 12, 1937

2,067,807

UNITED STATES PATENT OFFICE 2,067,807

REAR AXLE ASSEMBLY FOR MOTOR VEHICLES

Langdon Williams, Philadelphia, Pa.

Application May 7, 1935, Serial No. 20,256

2 Claims. (Cl. 180—73)

This invention relates to certain improvements in vehicle suspensions and particularly to a rear end suspension for automobiles.

The object of the invention is to provide a flexible mounting for the rear axle involving independently sprung wheels of the "knee action" type without materially changing or altering the conventional chassis or frame.

A further object is the production of a rear end suspension that will be simple in design and construction and economical to build and install.

Another object of the invention is to provide a suspension of the type indicated that will give the maximum riding comfort with safety and materially reduce tire wear.

Another object is to construct an assembly having independently sprung wheels for the driven axles without loss of power or altering in any way the rear end differential gearing.

Another object of the invention is to produce a flexible rear axle mounting adaptable to all present makes of cars and one that will not materially alter the wheel tread as desired, nor the wheel alignment.

Briefly stated the present invention comprises a rear axle assembly consisting of a differential housing rigidly supported from a cross frame member which in turn is rigidly secured to the longitudinal frame members. The differential within the housing may be of any desired conventional type and forms no part of the present invention.

The differential housing however is somewhat different from the usual housing and is preferably square or rectangular, providing means for pivotally securing thereto laterally disposed links or arms, said links being arranged in superimposed parallel pairs extending to a point adjacent the wheel mountings.

The outer ends of this link are pivotally connected to wheel bearing housings, springs being mounted between the upper faces of these housings and the vehicle frame.

The rear axle comprises universally connected sections, the outer ends of this axle being antifrictionally mounted in the aforesaid wheel bearing housings.

The preferred embodiment of the invention is illustrated in the accompanying drawing, in which Figure 1 is a view in rear elevation; and
Figure 2 is a bottom plan view.

Referring to the drawing in detail the improved assembly comprises a substantially square differential housing 1 rigidly secured by a bracket, plate or the like 2 to a transverse frame member 3, said frame member being in turn supported upon the longitudinal side frame members 4 and 5 of the conventional automobile frame.

Pivotally secured to each opposite upper corner of the differential housing 1 are two pairs of horizontally disposed arms or the like 6 and 8 respectively, the vertical faces of said arms being substantially flat.

Likewise secured to each opposite lower corner of the differential housing 1 are two pairs of horizontally disposed arms 7 and 9 respectively. These upper and lower pairs of arms are preferably maintained in proper relation by connecting reinforcing webs 10 and 11 as shown in Figure 2. In the drawing, as illustrated in Figure 2 which is a bottom plan view, these webs are shown only in connection with the lower arms 7 and 9, but it is to be understood that the arms 6 and 8 (Figure 1) are likewise provided with these reinforcing webs 10 and 11. These webs are cut away as shown in order to reduce all unnecessary weight without sacrificing strength.

The lower arms 7 and 9 are of the same construction and design as the upper arms 6 and 8 and are immediately below the said upper arms 6 and 8.

To the outer ends of the arms 6 and 8, and 7 and 9, are pivotally attached, substantially square axle bearing housings 14 and 15.

It will be noted that the front and rear faces of the differential housing 1 and the front and rear faces of the axle bearing housings 14 and 15 are flat and closely engage the horizontally arranged arms 6 and 8, and 7 and 9, which arms, where they engage the housings being also flat, so that these pivotal connections permit only substantially vertical movements of the axle housing members 14 and 15 and prevent any twisting or weaving of the assembly.

Interposed between the top of the bearing housings 14 and 15 are conventional springs or the like 16 and 17.

These springs may be of any preferred design and strength and are conventionally shown in the present drawing as coil springs. It will of course be understood that any other type of efficient spring device can be used, as long as the same are separate and independent springs.

Extending outwardly from the differential housing 1 on opposite sides are stub shafts 17 and 18, the inner ends of said shafts being connected through the necessary gearing to the differential in the usual manner.

Mounted in the axle bearing housings 14 and 15 are rear wheel supporting stub axles 19 and 10 respectively, said axles being provided with the usual bearings 21 and 22.

Connecting the stub shaft 17 and the stub axle 19 is a shaft 23 and these connections are provided with universal joints 24 and 25 for the obvious purpose of permitting the relative movements of the assembly under operative conditions, and the shaft 23 being splined as at 26 in order to properly cooperate with the universal joints during the operation of the assembly.

Similarly there is a shaft 27 provided with universal joints 28 and 29 cooperating with the stub shaft 18 and the stub axle 20 on the opposite side of the assembly. This shaft 27 is also necessarily provided with a spline 30.

With the arrangement as above described there will be permitted independent rise and fall of the rear wheels of the car without transmitting the usual twist or stress to the frame.

This is made possible in connection with the rear or driven axle by the particular arrangement as shown without materially altering the wheel tread or sacrificing any of the power transmitted to the differential housing.

By the use of the particular pivotal connections as shown between the differential housing, the axle bearing housings and the connecting arms as distinguished from universal joint connections at these points, a substantially rigid assembly is produced with respect to forward and rearward movements, any tendency towards twisting or weaving is prevented, at the same time permitting vertical pivotal or swinging movements of the assembly as desired.

Furthermore, due to the fixed position of the differential housing, a straight line drive may be used between said differential and the transmission without the use of universal joints as is the present practice. Obviously a straight line drive shaft will eliminate loss of power due to friction and angularity of shaft sections of the old conventional flexibly jointed shaft.

What I claim is:

1. In a vehicle suspension, the combination with a frame, of a rear axle assembly comprising a substantially square differential housing rigidly secured to said frame, a pair of upper and a pair of lower horizontally arranged substantially flat arms extending from each side of said housing and pivotally connected thereto for pivotal vertical or swinging movements only, a substantially square wheel bearing housing carried by the outer ends of each set of arms and pivotally connected thereto, the flat sides of the said arms being in engagement with the flat side faces of said housings, to permit vertical movements only, a spring interposed between the upper face of each wheel bearing housing and the car frame and a universally jointed axle carried by assembly.

2. In a vehicle suspension, the combination with a frame, of a rear axle assembly comprising a substantially square differential housing rigidly secured to said frame, a pair of upper and a pair of lower horizontally arranged substantially flat parallel arms extending from each side of said housing and pivotally connected thereto for pivotal vertical movements only, a substantially square wheel bearing housing carried by the outer end of each set of arms and pivotally connected thereto for vertical movements only, the flat inner faces of said arms being in engagement with the flat vertical side faces of said housings, stub shafts extending from opposite sides of the differential housing, a wheel supporting stub axle mounted in each wheel bearing housing, intermediate shaft sections connecting the respective stub shafts and stub axles, universal joints forming these connections and a spring interposed between the upper face of each wheel bearing housing and the car frame.

LANGDON WILLIAMS.